(12) United States Patent
Dybsetter et al.

(10) Patent No.: US 7,404,068 B2
(45) Date of Patent: Jul. 22, 2008

(54) SINGLE OPERATION PER-BIT MEMORY ACCESS

(75) Inventors: Gerald L. Dybsetter, Scotts Valley, CA (US); Jayne C. Hahin, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 599 days.

(21) Appl. No.: 10/704,049

(22) Filed: Nov. 7, 2003

(65) Prior Publication Data
US 2005/0099877 A1 May 12, 2005

(51) Int. Cl.
*G06F 7/38* (2006.01)
(52) U.S. Cl. ...................... 712/224; 712/245
(58) Field of Classification Search ............... 712/245, 712/216, 224, 243
See application file for complete search history.

(56) References Cited

U.S. PATENT DOCUMENTS 5,321,823 A * 6/1994 Grundmann et al. ........ 712/224
5,696,969 A * 12/1997 Egolf ........................ 718/104

* cited by examiner

*Primary Examiner*—Tonia L. M. Dollinger
(74) *Attorney, Agent, or Firm*—Workman Nydegger

(57) ABSTRACT

Mechanisms for performing per-bit operations in system memory in a single operation thereby obviating the need for semaphore mechanisms when performing per-bit operations. A processor accesses an instruction that identifies the specific bit of system memory that is to be operated upon, as well as an operation to be performed on the bit. The operation may be, for example, a bit set, clear, or toggle. The processor then instructs system memory to perform the operation. Since the operation is performed in a single operation, other processes do not need to wait before continuing operation on the memory address of the specific bit. In addition, semaphores restricting access to the memory address need not be used while still retaining adequate assurance that the memory address will remain consistent.

41 Claims, 3 Drawing Sheets

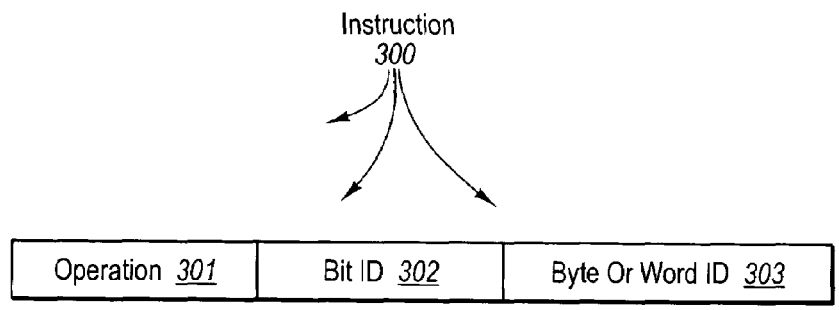
Fig. 3
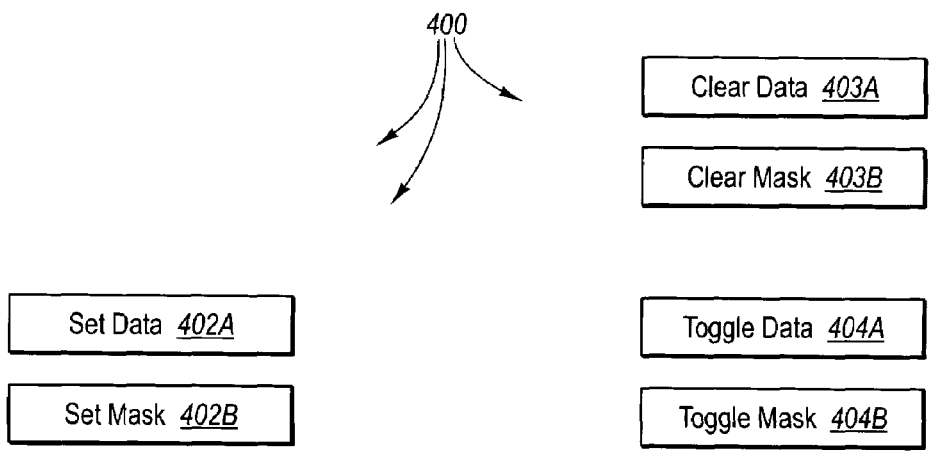
Fig. 4
Fig. 5A
Fig. 5B
Fig. 5C

SINGLE OPERATION PER-BIT MEMORY ACCESS

BACKGROUND OF THE INVENTION

1. The Field of the Invention

The present invention relates generally to mechanisms for accessing system memory. More particularly, the present invention relates to mechanisms for operating on system memory on a per-bit basis in a single processor operation.

2. Background and Relevant Art

Electronic and computing technology has transformed the way that we work and play. Many electronic or computing systems rely on system memory to retain information important for the proper operation of the system.

Information is maintained in system memory using binary digits which can be thought of as having a state of zero (i.e., off) or one (i.e., on). Each binary digit is often referred to as a "bit". Accordingly, a bit may store information regarding a Boolean value such as a configuration setting or a flag, and thus may convey information on its own.

However, more often, bits are clustered into groups of eight bits in what is referred to as a "byte". While a bit may convey information on its own, often it is the entire byte that conveys meaning. For example, one byte of memory may contain 256 (i.e., two to the power of eight) different values. A byte may just be used to represent any one of 256 colors, for example. Sometimes, groups of one or more bytes of memory are organized into entities called "words". Accordingly, words may contain 8 bits, 16 bits or any other positive integer multiple of 8 bits. For example, some systems may have executable instructions that have word lengths of 16, 32 or even 64 bits.

In order to change a value in memory, a processor typically loads a byte or a word from a system memory address into a processor register. The processor then performs an operation on this loaded value and places the result in a different processor register. The processor then stores the resulting value back into system memory. Accordingly, manipulation of memory is typically done in three separate phases; namely, load, process, and store. This takes some finite amount of time.

Meanwhile, other processes may try to access that same system memory address while the value from that address is in the very act of being manipulated by the processor. This may cause unstable results in that the resulting value will be different that what is expected. Accordingly, many systems typically use semaphore mechanisms to ensure that only one process at a time accesses a memory address. If a second process is to access that same memory address, then the second process waits until after the first process has written the resulting value to the system memory address and the first process releases that memory address. Accordingly, often processes need to wait before accessing particular memory addresses to ensure memory consistency.

Often, it would be appropriate for a process to change only a single bit in memory. After all, a single bit can contain information that is significant on its own, without reference to the byte or word that contains the bit. For example, as previously mentioned, the bit may represent a simple Boolean value such as a configuration setting or flag. Conventionally, in order to manipulate that bit, however, the entire byte or word needs to be loaded into a processor register, manipulated by the processor, and stored back into memory. Accordingly, the above-described semaphore mechanisms would be employed to m ensure memory consistency. What would be advantageous, however, are mechanisms in which the bit may be operated upon as desired, without requiring semaphore mechanisms that restrict access to system memory.

BRIEF SUMMARY OF THE INVENTION

The foregoing problems with the prior state of the art are overcome by the principles of the present invention, which are directed towards mechanisms for performing per-bit operations in system memory. The principles of the present invention may be practiced in a system that includes at least one processor and system memory. The system memory may include a bit-wise accessible portion that includes bits that may be individually operated upon, as well as a non-bit-wise accessible portion that does not include bits that may be individually operated upon without accessing other associated bits (e.g., the associated byte or word).

A processor accesses an instruction that identifies the specific bit of system memory that is to be operated upon, as well as an operation to be performed on the bit. The operation may be, for example, a bit set, clear, or toggle. The processor then instructs system memory to perform the operation. Accordingly, the bit operation may be performed using a single operation, rather than using the conventional three-phase mechanism in which the processor loads the entire byte or word associated with the specific bit, operates upon the byte or word, and then stores the byte or word back into system memory. Since the operation is performed using a single operation, other processes do not need to wait before continuing operation on the memory address of the specific bit. In addition, semaphores to A restricting access to the memory address need not be used while still retaining adequate assurance that the memory address will remain consistent.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a data structure of an instruction that, when executed, causes the processor(s) of FIG. 1 to perform bit-wise manipulation of system memory in accordance with the principles of the present invention;

FIG. 4 illustrates system memory with several registers that the system memory may use to manipulate a bit in response to the processor-issued instruction;

FIG. 5A illustrates a logic chart of a bit-wise comparison between a set register bit and a mask bit when system memory performs a set operation;

FIG. 5B illustrates a logic chart of a bit-wise comparison between a clear register bit and a mask bit when system memory performs a clear operation;

FIG. 5C illustrates a logic chart of a bit-wise comparison between a toggle register bit and a mask bit when system memory performs a toggle operation;

DETAILED DESCRIPTION OF THE PREFERRED EMBODIMENTS

The principles of the present invention provide for mechanisms for performing per-bit operations in system memory in a single cycle thereby obviating the need for semaphore mechanisms when performing per-bit operations. A processor accesses an instruction that identifies (either directly or perhaps indirectly with reference to one or more register values) the specific bit of system memory that is to be operated upon, as well as an operation to be performed on the bit. The operation may be, for example, a bit set, clear, or toggle. The processor then instructs system memory to perform the operation. Since the operation is performed in a single processor operation, other processes do not need to wait before continuing operation on the memory address of the specific bit. In addition, semaphores restricting access to the memory address need not be used while still retaining adequate assurance that the memory address will remain consistent.

Figure 1:
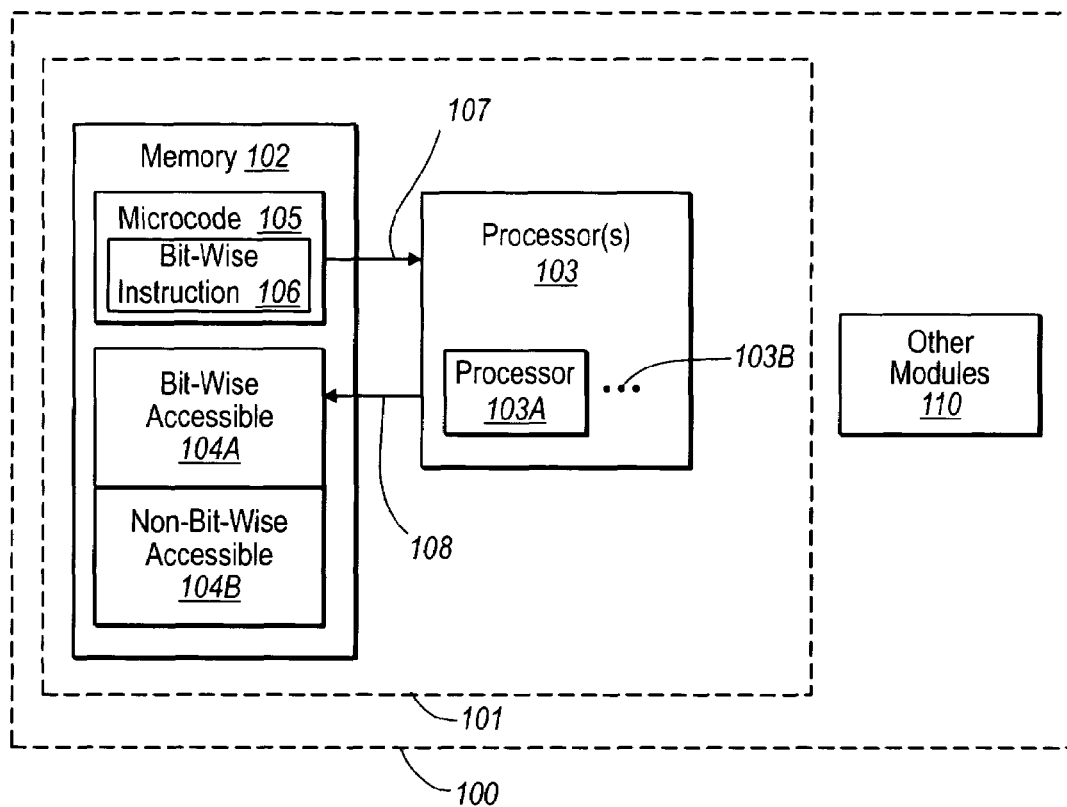
FIG. 1 illustrates an example of a system upon which bit-wise manipulation of system memory may be accomplished in accordance with the present invention.

Turning to the drawings, FIG. 1 illustrates a suitable electronic or computing system 100 in which the principles of the present invention may be employed. The most basic system configuration is represented by the components within the dashed box 101. As represented within the dashed box 101, system 100 includes a memory module 102, and one or more processors 103.

The memory 102 has thereon microcode 105 that is readable and executable by the one or more processors 103. The memory 102 may be volatile (such a Random Access Memory (RAM)), or may be non-volatile (such as Read Only Memory (ROM), Flash memory, or the like), or a combination or volatile or non-volatile memory. However, the memory 102 may be any memory capable of containing microcode that may be directly or indirectly accessed by the one or more processors 103 for execution. Such processor-readable media may include, but is not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by a processor.

The system memory 102 includes a bit-wise accessible portion 104A that includes bits that may be individually operated upon. In other words, the bit-wise accessible portion 104A may be addressed by the particular bit, rather than the conventional techniques in which memory locations are addressed by the entire byte or word of system memory. More regarding how the bit-wise accessible portion 104A allows bit-wise operations to be performed will be described further below. Although the bit-wise accessible portion 104A permits bit-wise access of bits without the processor having to operate on the entire associated byte or word, the system memory 102 may also optionally permit the processor to access the entire byte or word of the bit-wise accessible portion 104A of system memory 102. In other words, the bit-wise accessible portion 104A of system memory 102 need not be exclusively bit-wise accessible.

The system memory 102 also optionally includes a non-bit-wise accessible portion 104B that does not include bits that may be individually operated upon without accessing other associated bits. This is the typical kind of system memory access in which memory locations correspond to an entire byte or word. Accordingly, the processor works with the entire byte or word of system memory.

The microcode 105 includes an instruction 106 that instructs the processor to perform an instruction on a particular bit, without also manipulating the entire byte or word that contains the bit. This instruction 106 will also be referred to herein as a "bit-wise instruction". Examples of bit-wise instructions include an instruction to set, clear, or toggle a specific bit in system memory. Each type of bit-wise instruction may conform to an instruction set recognized by the one or more processors 103. In one embodiment, there may be several bit-wise instructions interspersed in the microcode 105 amongst other instructions that also conform to the instruction set.

The instruction 106 may be stored in the non-bit wise accessible portion 104B of system memory 102 if existing, in the bit-wise accessible portion 104A of system memory if that portion is not exclusively bit-wise accessible, or perhaps in an entirely different memory altogether contrary to the illustrated example of FIG. 1. So long as the bit-wise instruction is in a memory location that may be accessed by the one or more processors 103, any memory or memory location will suffice.

The one or more processors 103 include at least processor 103A as well as potentially others as represented by the horizontal ellipses 103B. At least one of the processors is capable of accessing the memory (e.g., memory 102) to execute the microcode 105 including the bit-wise instruction 106. The processor reads the bit-wise instruction as represented by the arrow 107. When the processor executes the bit-wise instruction, the processor instructs the system memory to satisfy the operation in system memory as represented by the arrow 108. Thus, the processor causes the system memory 102 to perform the specified operation on the specified bit without the processor having to deal with any further instructions to complete the operation. Accordingly, from the processor perspective, one instruction is all that is needed to complete the operation.

Figure 6:
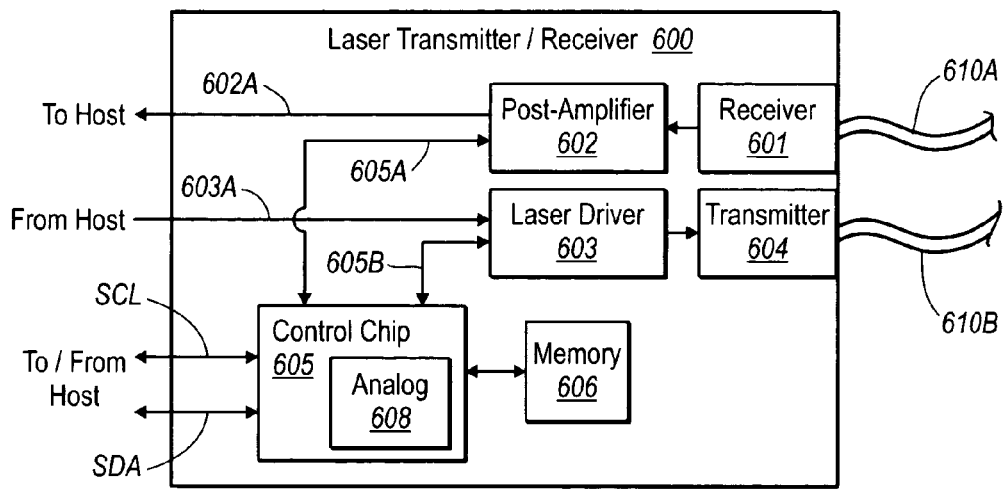
FIG. 6 illustrates a schematic diagram of a laser transmitter/receiver that represents one of many systems in which the principles of the present invention may be employed.

Optionally, there may be other modules 110 within the system 100. Whether or not there are other modules 110, and the nature of the modules 110, will depend on the nature of the system 100. The system 100 may be any electronic or computing system including, but not limited to any general-purpose or special-purpose computing or communications environments or configurations. Examples of well known computing systems, environments, and configurations include, but are not limited to, laser transmitter/receivers, mobile telephones, pocket computers, personal computers, servers, multiprocessor systems, microprocessor-based systems, minicomputers, mainframe computers, and distributed computing environments that include any of the above systems or devices. Any of these example systems are suitable for use with the principles of the present invention If the system 100 was a general-purpose computing system, the other modules 110 may include, for example, video adaptor modules, network interface modules, hard disk drive interfaces, optical disk drive interfaces, magnetic disk drive interfaces, or the like. If the system 100 was a laser transmitter/receiver, the other modules 110 may include laser drivers, analog-to-digital converters, digital-to-analog converters, serial interface controllers, or the like. FIG. 6 illustrates a specific embodiment of a laser transmitter/receiver 600, which will be described in further detail below with respect to FIGS. 6 and 7. However, those of ordinary skill in the art will recognize after having read this disclosure, that the principles of the present invention are not limited to application in a general-purpose computing system, or a laser transmitter/receiver, notwithstanding the detailed description of the laser transmitter/receiver which follows further below.

Figure 2:
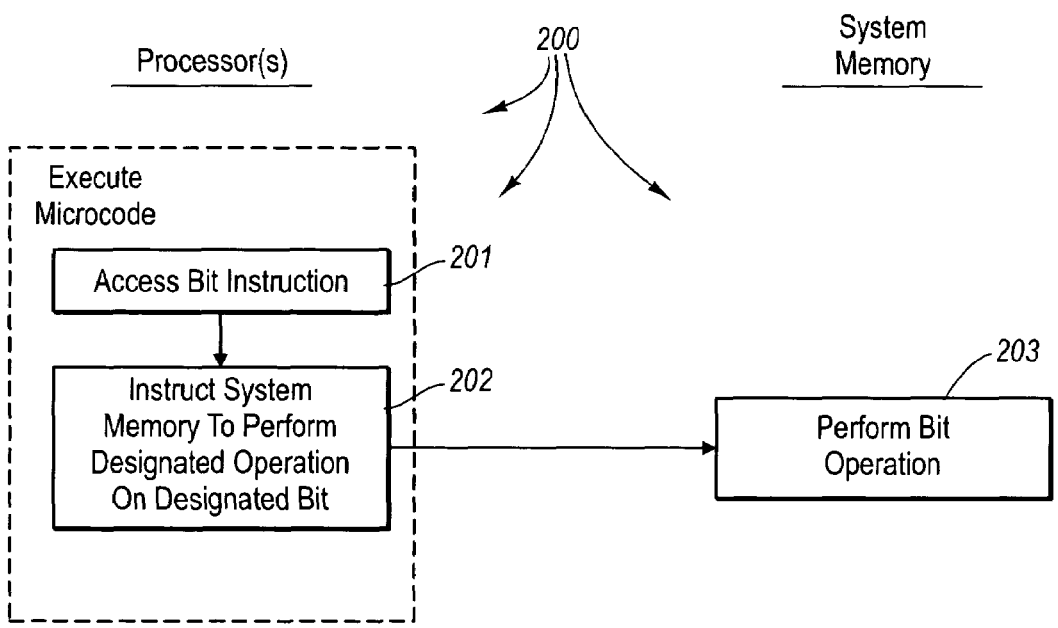
FIG. 2 illustrates a flowchart of a method for operating upon a specific bit of system memory in accordance with the principles of the present invention.

FIG. 2 illustrates a flowchart of a method 200 of operating upon a specific bit of system memory. As the method 200 may be executed in the system 100 of FIG. 1, the method 200 will now be described with frequent reference to the system 100. Some of the acts of the method 200 are performed by a processor such as the one or more processors 103 and thus are illustrated in the left column of FIG. 2 under the heading "Processor(s)". Another act of the method 200 is performed by system memory that includes the specific bit (such as system memory 102) and thus is illustrated in the right column of FIG. 2 under the heading "System Memory".

Potentially in the midst of executing other microcode, a processor accesses an instruction that identifies the specific bit of system memory, as well as an operation to be performed on the bit (act 201). For example, FIG. 1 illustrates that the one or more processors 103 accesses the bit-wise instruction 106.

FIG. 3 illustrates a data structure of a bit-wise instruction 300. The instruction 300 includes an operation field 301 that identifies the type of bit-wise operation. For example, the operation field 301 may identify the instruction as being a bit set instruction, a bit clear instruction, or a bit toggle instruction.

The instruction 300 also includes a byte or word identifier field 303 which identifies the specific byte or word in the bit-wise accessible portion of system memory. In one embodiment, the byte or word is identified with an implied offset corresponding to the lowest address in the bit-wise accessible portion of system memory. This would allow a fewer number of bits needed in the byte or word identifier field 303 to uniquely identify the specific byte or word that contains the specific bit to be operated upon. For example, if the bit-wise accessible portion of system memory was only 64 bytes, only six bits would be needed to identify the byte in the bit-wise accessible portion, or only five bits would be needed to identify a particular 16-bit word in the bit-wise accessible portion, or only four bits would be needed to identify a particular 32-bit word in the bit-wise accessible portion, and so on. Identifying the byte or word address using this offset would be particularly useful if the instruction was limited to 16 bits.

The instruction 300 includes a bit identifier field 302 which identifies the specific bit that is to be operated upon within the specific byte or word identified in the byte or word identifier field 303. If the byte or word identifier field 303 identified the specific byte, then three bits would be needed in the bit identifier field 302 in order to uniquely identify the bit. If the byte or word identifier field 303 identified a specific 16-bit word, then four bits would be needed in the bit identifier field 302 in order to uniquely identify the bit. If the byte or word identifier field 303 identified the specific 32-bit word, then five bits would be needed in the bit identifier field 302 in order to uniquely identify the bit, and so on.

The bit identifier field 302 and the byte or word identifier field 303 collectively uniquely identify a bit in the bit-wise accessible portion of system memory. The precise configuration of the data structure of the instruction is not important so long as the instruction contains sufficient information for the processor to identify the operation and specific bit in the system memory that is to be operated upon.

The bit identifier field 302 may directly include an identification of the bit, while the byte or word identifier field 303 may directly include an identification of the associated byte or word that contains the bit. In one alternative, however, the bit identifier field 302 includes an identification of a location (e.g., a processor register) that includes an identification of a bit. In addition, the byte or word identifier field 303 may include an identification of a location (e.g., a processor register) that includes an identification of the associated byte or word (once again with the optional implied offset). In one embodiment, the register that contains the identification of the bit may be a mask in which multiple bits are specified to be operated upon. Even in this alternative configuration, however, once the registers are set with the appropriate bits to be operated upon, and the associated byte or word, the processor performs the operation in a single operation.

The processor is configured to respond to execution of the bit-wise instruction by instructing system memory to perform the operation on the bit without the processor beforehand reading the associated byte or word that includes the specific bit (act 202). The manner of such instruction is not important so long as the system memory recognizes the instruction in the sense that it responds to the instruction by performing the operation on the bit. In one embodiment, system memory responds to the instruction without further intervention from the processor, thereby allowing the bit-wise operation to be completed using one processor instruction.

FIG. 4 illustrates several internal non-processor registers that system memory (such as memory 102) may utilize when responding to an instruction (such as instruction 108).

The system memory also includes a means for imposing the bit set operation upon the specific bit(s) if the instruction was to set a specific bit. The instruction provided from the processor to the system memory may include an identification of the specific byte or word identification that contains the specific bit or bits to be set. The system memory responds by reading the byte or word 402A (hereinafter referred to as the "set data") that has one or more bits to be set.

The processor also identifies the specific bit or bits that are to be operated upon to the system memory. In one embodiment, the processor does this by supplying a mask 402B of the same length as the set data 402A. The set mask 402B includes a logical one only at the bit or bits that correspond to the specific bit(s) to be operated upon. The system memory receives the set mask 402B.

Then, a bit-wise operation is performed between the set data 402A and the set mask 402B. FIG. 5A illustrates a logic diagram showing the desired outcomes for a given bit-wise set operation. Specifically, if the corresponding set mask bit is a zero, then the output bit is simply the same as the current set data bit. If the corresponding set mask bit is a one (corresponding to the bit to be set), then the output bit is a one regardless of the current set data bit. This bit-wise comparison may be accomplished by bit-wise logical OR'ing the set data 402A and the set mask 402B. The result is then stored back into memory thereby successfully setting the bit or bits specified by the set mask.

In one embodiment that may be implemented if only one bit is to be operated upon, the processor may also enable a status flag indicating that the specified set data bit was already set (i.e., had a value of one). This outcome is represented in the chart of FIG. 5A using an asterix in the upper left corner of the outcome that resulted from both the set mask bit and the set data bit being equal to one. The status flag value may be obtained by bit-wise AND'ing the set data from the set register 402A with the set mask in the set mask register 402B, and by logically OR'ing each of the bit results. The processor may then query the status flag and thus determine that the specific set data bit was already set prior to the bit set operation being implemented on system memory. The processor may then perform a conditional branch depending on the value of the status flag.

The system memory also includes a means for imposing the bit clear operation upon the specific bit(s) if the instruction was to clear a specific bit. The instruction provided from the processor to the system memory may include an identification of the specific byte or word identification that contains the specific bit or bits to be cleared. The system memory responds by reading the byte or word 403A (hereinafter referred to as the "clear data") that has the one or more bits to be cleared.

The processor also identifies the specific bit or bits that are to be operated upon to the system memory. Once again, the processor may do this by supplying a mask 403B of the same length as the clear data 403A, with the clear mask 403B including a one only at the bit or bits that correspond to the specific bit(s) to be operated upon. The system memory receives the clear mask 403B.

Then, a bit-wise operation is performed between the clear data 403A and the clear mask 403B. FIG. 5B illustrates a logic diagram showing the desired outcomes for a given bit-wise clear operation. Specifically, if the corresponding clear mask bit is a zero, then the output bit is simply the same as the current clear data bit. If the corresponding clear mask bit is a one (corresponding to the bit to be cleared), then the output bit is a zero regardless of the current clear data bit. This bit-wise comparison may be accomplished by bit-wise logical AND'ing the clear data 403A with inverted bits from the clear mask 403B. The result is then stored back into memory thereby successfully clearing the bit or bits specified by the clear mask 403B.

In one alternative embodiment that may be implemented if only one bit is to be operated upon, the processor may enable a status flag when clearing bits as well. Specifically, if the specified clear data bit was already cleared (had a value of zero), then the status flag is set. This outcome is represented in the chart of FIG. 5B using an asterix in the upper left corner of the outcome that resulted from both the clear mask bit and the clear data bit being equal to one. This could be done by bit-wise AND'ing the inverted form of the clear mask bit with the clear data bit, and by logically OR'ing the resulting bits with the status flag. The processor may then query the output flag and thus determine that the specific clear data bit was already cleared prior to the bit clear operation. The processor may then perform a conditional branch depending on the value of the output flag.

The system memory also includes a means for imposing the bit toggle operation upon the specific bit(s) if the instruction was to toggle a specific bit. The instruction provided from the processor to the system memory may include an identification of the specific byte or word identification that contains the specific bit. The system memory responds by reading the byte or word 404A (hereinafter referred to as the "toggle data") that has the one or more bits to be toggled.

The processor also identifies the specific bit or bits that are to be operated upon to the system memory. In one embodiment, the processor does this by supplying a mask 404B of the same length as the toggle data 404A. The toggle mask 404B includes a one only at the bit or bits that correspond to the specific bit to be operated upon. The system memory receives the toggle mask 404B.

Then, a bit-wise operation is performed between the toggle data 404A and the toggle mask 404B. FIG. 5C illustrates a logic diagram showing the desired outcomes for a given bit-wise operation. Specifically, if the corresponding toggle mask bit is a zero, then the output bit is simply the same as the current toggle data bit. If the corresponding toggle mask bit is a one (indicating that that bit is to be toggled), then the output bit is a zero if the toggle data bit was a one, and the output bit is a one if the toggle data bit was a zero. This bit-wise comparison may be accomplished by bit-wise logical exclusive OR'ing the toggle data 404A and the toggle mask 404B. The result is then stored back into memory thereby successfully toggling the bit or bits specified by the toggle mask 404B.

In one embodiment, the processor may simply test the value of a bit, wherein a processor flag is set if the bit has a binary one value, and another processor flag is set if the bit has a binary zero value. The processor may then perform a conditional branch through the microcode depending on the tested value.

Since the operation is performed using a single operation, the processor accomplishes the per-bit operation atomically in one transaction. Other processes do not need to wait before continuing operation on the memory address of the specific bit. In addition, semaphores restricting access to the memory address need not be used while still retaining adequate assurance that the memory address will remain consistent.

As previously mentioned, more than one of the bits may be operated upon in a single processor operation. In addition, the bit identifier field 302 and the byte or word identifier field 303 need not directly contain the bit identification and the byte or word identification.

For example, in one 16-bit instruction, six bits may be used to specify that the operation is a bit-wise instruction. A seventh bit is used to specify whether or not the operation is on a bit within a byte of memory or within a word of memory. An eighth bit is used to specify whether or not to load the pre-operation byte or word into a processor register to thereby allow the processor to check the previous value of the byte or word. A ninth and tenth bit are used to specify one of four operations; namely, load, set, clear, or toggle. An eleventh through thirteenth bit may be used to specify one of eight registers where a mask is located, the mask specifying the bit(s) to be manipulated. A fourteenth through sixteen bit may be used to specify one of eight registers where the offset address of the associated byte or word is located.

In this case, the mask in the processor register location may be provided to the set, clear or toggle mask registers for the set, clear or toggle operations, respectively. For the load operation, the mask value becomes irrelevant and the identified byte or word is merely loaded into a processor register.

Note how the operation gives the option of having the old value of the byte or word loaded into a processor register. In order to accomplish this, the byte or word is not only written into the system memory register location (e.g., set register 402A, clear register 403A or toggle register 404A as appropriate), but the processor also instructs system memory to load the byte or word into the processor register.

FIG. 6 illustrates a laser transmitter/receiver 600 in which the principles of the present invention may be employed. While the laser transmitter/receiver 600 will be described in some detail, the laser transmitter/receiver 600 is described by way of illustration only, and not by way of restricting the scope of the invention.

The laser transmitter/receiver 600 receives an optical signal from fiber 610A using receiver 601. The receiver 601 transforms the optical signal to an electrical signal and provides that electrical signal to a post-amplifier 602. The post-amplifier 602 amplifies the signal and provides the amplified signal to the host as represented by arrow 602A.

The laser transmitter/receiver 600 may also receive electrical signals from the host for transmission onto the fiber 610B. Specifically, the laser driver 603 receives the electrical signal as represented by the arrow 603A, and drives the transmitter 604 (i.e., the laser) with signals that cause the transmitter 604 to emit onto the fiber 610B optical signals representative of the information in the electrical signal provided by the host.

The behavior of the receiver 601, the post-amplifier 602, the laser driver 603, and the transmitter 604 may vary dynamically due to a number of factors. For example, temperature changes, power fluctuations, and feedback conditions may each affect the performance of these components. Accordingly, the laser transmitter/receiver 600 includes a control chip 605, which evaluates temperature and voltage conditions, and receives information from the post-amplifier 602 (as represented by arrow 605A) and from the laser driver 603 (as represented by arrow 605B), which will allow the control chip 605 to counteract the dynamically varying performance, and detect when there is a loss of signal.

Specifically, the control chip 605 may counteract these changes by adjusting settings on the post-amplifier 602 and/or laser driver 603 as represented by the arrows 605A and 605B. The control chip 605 has access to a non-volatile memory 606, which in one embodiment, is an Electrically Erasable and Programmable Read Only Memory (EE-PROM). Data and clock signals may be provided from the host to the control chip 605 using the serial clock line SCL, and the serial data line SDA. Also data may be provided from the control chip 605 to the host using serial data signal SDA to allow for digital diagnostics and readings of temperature levels, transmit/receiver power levels, and the like.

The control chip 605 includes both an analog portion 608 and a digital portion. Together, they allow the control chip to implement logic digitally, while still largely interfacing with the rest of the laser transmitter/receiver 600 using analog signals. For example, the analog portion 608 may contain digital to analog converters, and analog to digital converters, high speed comparators (e.g., for event detection), voltage based reset generators, voltage regulators, voltage references, clock generator, and other analog components.

Figure 7:
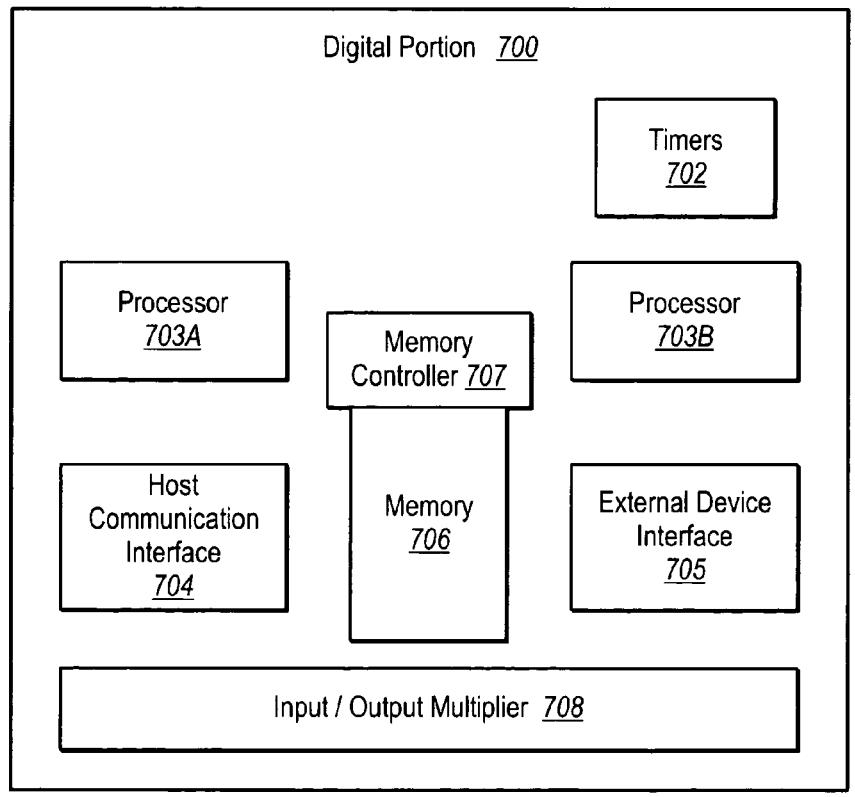
FIG. 7 illustrates a digital portion of the control chip illustrated in FIG. 6, the digital portion including a memory that includes the bit-wise accessible portion.

FIG. 7 illustrates the digital portion 700 of control chip 605 in further detail. For instance, a timer module 702 provides various timing signals used by the digital portion. Such timing signals may include, for example, programmable processor times. The timer module 702 may also act as a watchdog timer that, for example, resets to a particular value when a processor generates a watchdog signal, and then counts down from the value until the next watchdog signal is detected when the value is once again reset to the particular value. Alternatively, if the watchdog timer decrements down to a minimum value, then the watchdog timer module 702 may take corrective action if the watchdog timer would not normally decrement to that value unless the processor had ceased or slowed execution of the microcode.

Two general-purpose processors 703A and 703B are also included, and are each configured to generate the watchdog signal when encountering a watchdog instruction. In this sense, the processors 703 may behave as the one or more processors 103 described above with respect to FIGS. 1 and 2. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 703A and 703B are each a 16-bit processor and may be identically structured.

A host communications interface 704 is used to communicate with the host using the serial clock line SCL and the serial data line SDA of the laser transmitter/receiver 600. The external device interface 705 is used to communicate with, for example, other modules within the laser transmitter/receiver 600 such as, for example, the post-amplifier 602, the laser driver 603, or the memory 606.

The memory 706 may be Random Access Memory (RAM). The memory control 707 shares access to the memory 706 amongst each of the processors 703A and 703B and with the host communication interface 704 and the external device interface 705. This memory 706 may contain microcode that includes bit-wise instructions. Accordingly, the memory 706 may behave as the memory 102 described above with respect to FIGS. 1 through 4 and 5A through 5C.

An input/output multiplexer 708 multiplexes the various input/output pins of the control chip 605 to the various components within the control chip 605. This enables different components to dynamically assign pins in accordance with the then-existing operational circumstances of the chip. Accordingly, there may be more input/output nodes within the control chip 605 than there are pins available on the control chip 605, thereby reducing the footprint of the control chip 605.

Having described a specific environment with respect to FIGS. 6 and 7 in which the principles of the present invention described with respect to FIGS. 1 through 4 and 5A through 5C may be employed, it will be understood that this specific environment is only one of countless architectures in which the principles of the present invention may be employed. As previously stated, the principles of the present invention are not intended to be limited to any particular environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a system that includes at least one processor and system memory, a method of operating upon a specific bit of system memory comprising the following:

an act of a processor accessing an instruction that identifies the specific bit of system memory, as well as an operation to be performed on the bit;

an act of providing a group of mask bits to system memory; and an act of the processor instructing system memory to perform the operation on the bit using the group of mask bits without the processor beforehand reading associated bits that include the specific bit.

2. A method in accordance with claim 1, wherein the act of a processor accessing an instruction that identifies the specific bit of system memory comprises the following:
   an act of the processor accessing the instruction from the system memory.
3. A method in accordance with claim 1, wherein the act of a processor accessing an instruction that identifies the specific bit of system memory comprises the following:
   an act of the processor accessing the instruction from a memory other than the system memory that includes the specific bit.
4. A method in accordance with claim 1, wherein the operation is a bit set operation.
5. A method in accordance with claim 4, further comprising the following:
   an act of the processor reading an indication that the specific bit was already set prior to the bit set operation being implemented on system memory.
6. A method in accordance with claim 4, wherein the act of the processor instructing system memory to perform the operation on the bit comprises the following:
   an act of identifying, to system memory, a byte that includes the specific bit; and
   wherein the group of mask bits constitute a mask byte and the system memory sets the specific bit by reading the identified byte and using the mask byte to set the specific bit.
7. A method in accordance with claim 6, wherein the mask byte identifies more than one bit to be set including the specific bit.
8. A method in accordance with claim 4, wherein the act of the processor instructing system memory to perform the operation on the bit comprises the following:
   an act of identifying, to system memory, a word that includes the specific bit; and
   wherein the group of mask bits constitute a mask word and the system memory sets the specific bit by reading the identified word and using the mask word to set the specific bit.
9. A method in accordance with claim 8, wherein the mask word identifies more than one bit to be set including the specific bit.
10. A method in accordance with claim 1, wherein the operation is a bit clear operation.
11. A method in accordance with claim 10, further comprising the following:
    an act of the processor reading an indication that the specific bit was already cleared prior to the bit clear operation being implemented on system memory.
12. A method in accordance with claim 11, wherein the act of the processor instructing system memory to perform the operation on the bit comprises the following:
    an act of identifying, to system memory, a byte that includes the specific bit; and
    wherein the group of mask bits constitute a mask byte and the system memory sets the specific bit by reading the identified byte and using the mask byte to set the specific bit.
13. A method in accordance with claim 12, wherein the mask byte identifies more than one bit to be cleared including the specific bit.
14. A method in accordance with claim 11, wherein the act of the processor instructing system memory to perform the operation on the bit comprises the following:
    an act of identifying, to system memory, a word that includes the specific bit
    wherein the group of mask bits constitute a mask word and the system memory sets the specific bit by reading the identified word and using the mask word to set the specific bit.
15. A method in accordance with claim 14, wherein the mask word identifies more than one bit to be cleared including the specific bit.
16. A method in accordance with claim 1, wherein the operation is a bit toggle operation.
17. A method in accordance with claim 1, wherein the instruction includes the following:
    a first field that represents the operation;
    a second field that represents a bit upon which the operation is to be performed within a byte of system memory; and
    a third field that identifies the byte of system memory.
18. A method in accordance with claim 17, wherein the second field includes the bit to be operated upon.
19. A method in accordance with claim 17, wherein the second field includes a pointer to a memory location that identifies the specific bit to be operated upon.
20. A method in accordance with claim 19, wherein the memory location is a processor register.
21. A method in accordance with claim 17, wherein the third field includes the address of the byte to be operated upon.
22. A method in accordance with claim 17, wherein the third field includes a pointer to a memory location that identifies the address of the byte that includes the bit to be operated upon.
23. A method in accordance with claim 22, wherein the memory location is a processor register.
24. A method in accordance with claim 1, wherein the byte of system memory represents an offset within a bit-wise accessible portion of system memory.
25. A method in accordance with claim 1, wherein the system memory includes the following:
    a bit-wise accessible portion of system memory that includes bits that may be individually operated upon include the specific bit operation upon; and
    a non-bit-wise accessible portion that does not include bits that may be individually operated upon without accessing other associated bits.
26. A method in accordance with claim 1, wherein the instruction includes the following:
    a first field that represents the operation;
    a second field that represents a bit within upon which the operation is to be performed within a word of system memory; and
    a third field that identifies the word of system memory.
27. A method in accordance with claim 26, wherein the second field includes the bit to be operated upon.
28. A method in accordance with claim 26, wherein the second field includes a pointer to a memory location that identifies the specific bit to be operated upon.
29. A method in accordance with claim 28, wherein the memory location is a processor register.
30. A method in accordance with claim 26, wherein the third field includes the address of the word to be operated upon.
31. A method in accordance with claim 26, wherein the third field includes a pointer to a memory location that includes the address of the word that includes the bit to be operated upon.
32. A method in accordance with claim 31, wherein the memory location is a processor register.
33. A method in accordance with claim 1, further comprising the following:

an act of the system memory performing the operation on the bit without further intervention from the processor.

34. A method in accordance with claim 1, wherein the instruction identifies a plurality of bits of system memory to be operated upon within a single byte including the specific bit, but not including all of the bits in the byte.

35. A method in accordance with claim 1, wherein the instruction identifies a plurality of bits of system memory to be operated upon within a single word including the specific bit, but not including all of the bits in the word.

36. A processor configured to do the following when coupled to a system that includes a system memory that includes a bit-wise accessible portion:
   an act of accessing an instruction that identifies a specific bit of the bit-wise accessible portion of system memory, and also identifies an operation to be performed on the bit;
   an act of providing a group of mask bits to system memory; and
   an act of instructing system memory to perform the operation on the bit using the group of mask bits without the processor beforehand reading associated bits that include the specific bit.

37. A processor in accordance with claim 36, wherein the act of accessing an instruction that identifies the specific bit of the bit-wise accessible portion of system memory comprises the following:
   an act of accessing the instruction from the system memory.

38. A processor in accordance with claim 36, wherein the act of accessing an instruction that identifies the specific bit of the bit-wise accessible portion of system memory comprises the following:
   an act of accessing the instruction from a memory other than the system memory.

39. A processor in accordance with claim 36, wherein the operation is a bit set operation.

40. A processor in accordance with claim 36, wherein the operation is a bit clear operation.

41. A processor in accordance with claim 36, wherein the operation is a bit toggle operation.

* * * * *

UNITED STATES PATENT AND TRADEMARK OFFICE
CERTIFICATE OF CORRECTION

| | | |
|---|---|---|
| PATENT NO. | : 7,404,068 B2 | Page 1 of 2 |
| APPLICATION NO. | : 10/704049 | |
| DATED | : July 22, 2008 | |
| INVENTOR(S) | : Dybsetter et al. | |

It is certified that error appears in the above-identified patent and that said Letters Patent is hereby corrected as shown below:

Drawings
Sheet 3, replace FIG. 7 with the figure depicted below, wherein "Input / Output Multiplier" is changed to --Input / Output Multiplexer--

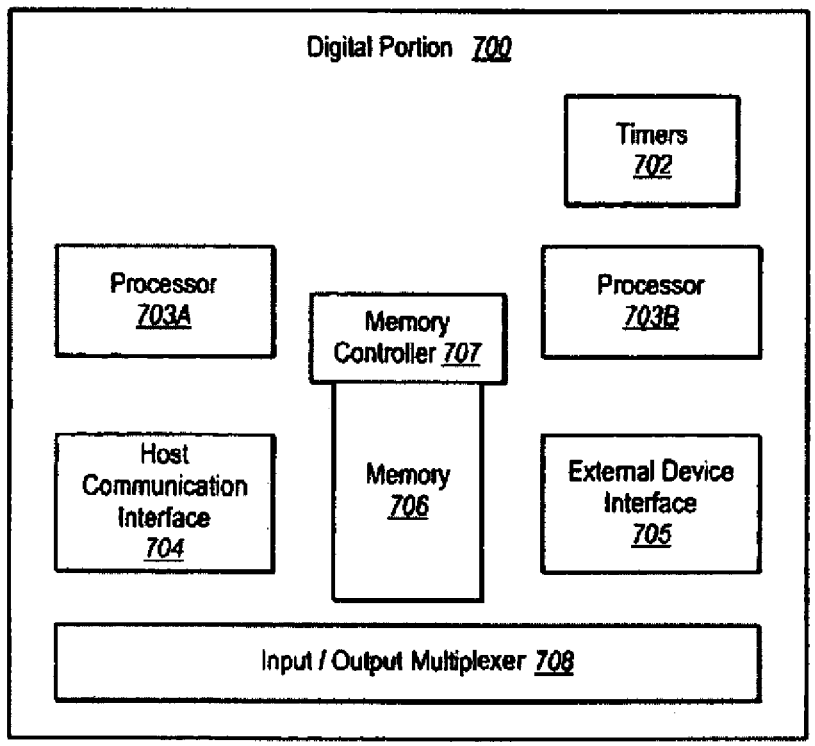

Fig. 7

Column 2
Line 30, change "semaphores to A restricting access" to --semaphores restricting access--

Column 3

Signed and Sealed this
Twenty-sixth Day of June, 2012

David J. Kappos
*Director of the United States Patent and Trademark Office*

CERTIFICATE OF CORRECTION (continued)
U.S. Pat. No. 7,404,068 B2

Line 25, change "single cycle thereby" to --single cycle, thereby--

Column 4
Line 36, change "instruction is in a memory location" to --instruction 106 is in a memory location--

Column 5
Line 2, change "present invention" to --present invention.--

Column 6
Line 40, change "non-processor registers" to --non-processor registers 400--
Line 41, change "(such as memory 102)" to --(such as memory 102 of FIG. 1)--
Line 42, change "(such as instruction 108)." to --(such as instruction 108 of FIG. 1).--
Line 61, change "diagram" to --diagram 500A--

Column 7
Line 37, change "logic diagram" to --logic diagram 500B--
Lines 54 and 55, change "from both the clear mask bit and the clear data bit being equal to one." to --from the clear mask bit being equal to one and the clear data bit being equal to zero.--

Column 8
Line 13, change "logic diagram" to --logic diagram 500C--
Line 39, change "identifier field 303" to --identifier field 303 of FIG. 3--
Line 65, change "toggle register 404A" to --toggle register 404A of FIG. 4--

Column 9
Line 46, change "control chip" to --control chip 605--

Column 10
Line 6, change "The processors" to --The processors 703--